United States Patent Office 2,766,879
Patented Oct. 16, 1956

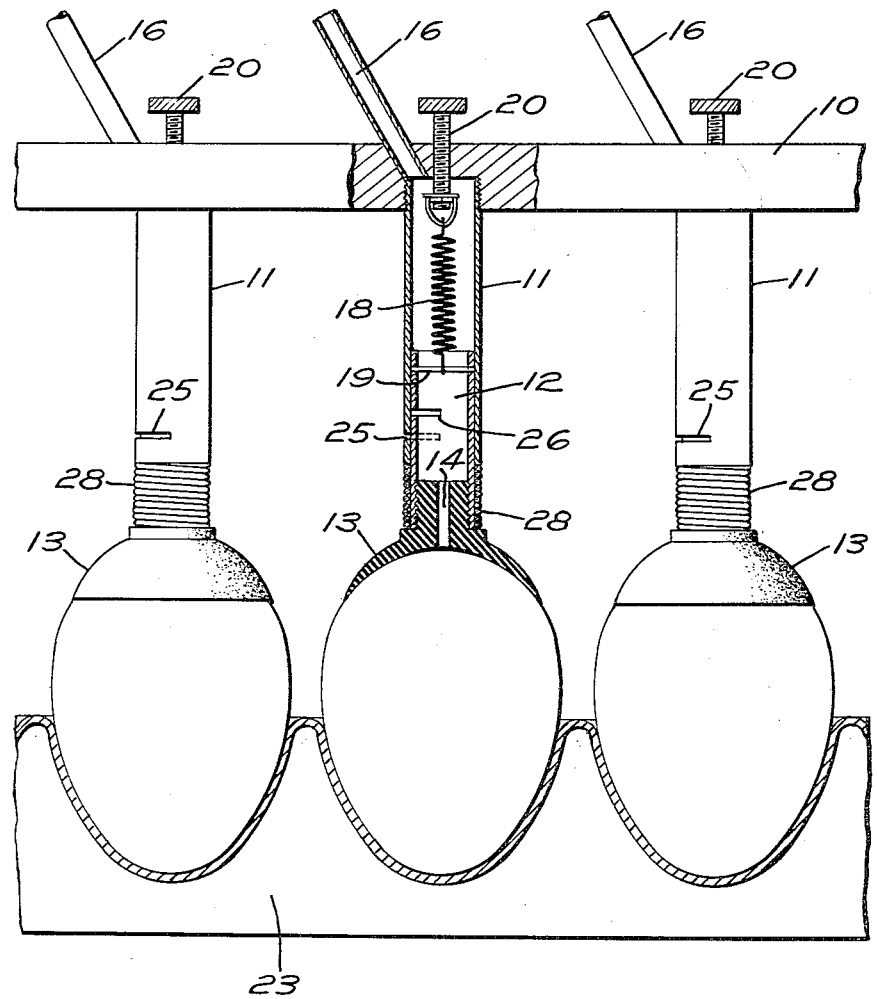

2,766,879

EGG HANDLING APPARATUS

Roy E. Draper, Albion, N. Y.

Application January 18, 1955, Serial No. 482,457

5 Claims. (Cl. 209—121)

This invention relates to the art of handling eggs and more particularly to an egg lifting apparatus which discriminates between eggs of different weights.

Various mechanisms for automatically weighing eggs in mass handling procedures have previously been proposed, most of them being of intricate and rather complicated construction. The apparatus of the present invention is intended to segregate eggs or discriminate between eggs within different weight classes in a highly simple and foolproof manner without complicated mechanism and as a mere incident in the lifting and handling of eggs for other or related purposes.

Speaking generally, the apparatus of the present invention comprises a suction cup egg lifting and placing device wherein each individual egg lifter is so arranged that it will release or reject eggs which vary from a predetermined standard by a predetermined degree. The egg lifting means is provided with means which move yieldably in varying degrees under the influence of eggs of various weights in such manner that the lifting suction or partial vacuum is dissipated or rendered nugatory when eggs outside of a predetermined accepted range as to weight are encountered.

A single somewhat schematic form of the apparatus of the present invention is illustrated in the accompanying drawing and described in the following specification. However, it is to be understood that the apparatus set forth by way of example is merely explanatory of the principles of the present invention, the scope of which is not limited thereto or otherwise excepting as defined in the appended claims.

The single figure of the drawing is a fragmentary elevational view, partly in cross section, showing one form of the apparatus of the present invention.

Referring to the drawing, the numeral 10 designates a horizontal bar or beam which is adapted to support, lift, transport or otherwise handle a plurality of eggs in the course of various egg handling processes of various kinds, such, merely by way of example, as egg washing, candling, inspecting, packing and the like.

The beam 10 may in some instances be stationary, the eggs being transported or moved thereto and therefrom in various ways, but in another common instance of use the bar or beam 10 will be movable to a group of eggs to be lifted in any desired manner and, generally as an incident to other egg handling procedures, movable to transfer the group of eggs to another predetermined point, the egg weighing or size-segregating function of the present invention being accomplished as an incident to such other handling or transfer.

Any desired number of eggs may be simultaneously dealt with and in the present instance a series of depending tubes or sleeves 11 is shown rigidly associated with bar or beam 10. A further series of sleeves 12 telescope within the lower portions of the sleeves 11 and terminate at their lower ends in downwardly concaved resilient vacuum lifting or suction cups 13.

Each suction cup member 13 is shaped to fit approximately over the top of an egg as shown in cross section in the central portion of the drawing and each member 13 is provided with a central bore 14 whereby free fluid passage is provided upwardly from the lower face of member 13 through the sleeve 12, thence through sleeve 11, and finally through a conduit 16 which communicates with the upper portion of each sleeve 11 and leads therefrom to a suitable source of sub-atmospheric fluid pressure.

Conduits 16 may be flexible to permit various movements of the bar or beam member 10 or may be connected with other flexible conduit portions or may be arranged in any other desired manner to accommodate movement of the bar or beam member 10 when such member is arranged movably. In any event, sub-atmospheric pressure or suction may be applied through conduits 16 to cause eggs to be retained in the lower concave portions of the members 13.

Inner sleeve 12 is slidable in outer sleeve 11 and is resiliently restrained against downward movement by an extension coil spring 18 which is anchored at its lower end to inner sleeve 11 as by a pin 19 and is adjustably anchored to the rigid structure comprising bar or beam member 10 and sleeve 11 by means of a screw 20 which permits vertical adjustment of the upper end of spring 18 and consequent adjustment of the resilient force exerted thereby.

After bar or beam 10 has moved into a position to engage a group of eggs, or after a group of eggs has been moved to be engaged by the lifting devices associated with bar or beam 10, and after vacuum or sub-atmospheric pressure is applied to exert a lifting force on the eggs through the apertures 14, a plurality of eggs of various sizes within certain limits may be lifted by the foregoing apparatus by upward movement of bar or beam 10 or supported thereby upon downward movement of the means employed for supporting the eggs prior to operation of the above-described apparatus, as for instance an egg crate or carton 23.

Upon such relative lifting or separating movement with eggs supported by the suction cups 13 the inner sleeves 12 move downwardly under the influence of the weights of the eggs lifted thereby and in proportion to such weights, causing a varying extension of the several springs 18 depending upon the weights of the eggs.

In any individual case where an egg exceeding a predetermined weight is lifted, inner sleeve 12, when moved downwardly, can extend spring 18 sufficiently to cause registry between a lateral slot 25 in sleeve 11 and a lateral slot 26 in sleeve 12, which slots are normally displaced somewhat as shown in the drawing.

When an egg of sufficient weight to produce such registry between slots 25 and 26 is encountered and the slots do so register the lifting vacuum or sub-atmospheric pressure to that particular suction cup 13 is dissipated through the registering slots to negative the lifting force and cause the egg of excess weight to be released by the suction cup member.

The egg may cause the aforesaid extension of spring 18 during the lifting operation, so that actually the egg is not lifted from the support 23 or the like but is merely not raised by the apparatus upon a lifting or separating movement. In the alternative, if the mechanism is so arranged that the release operates only after a lifting operation has taken place, means must be provided to prevent such droppage of an egg as would result in its breakage.

In the form shown in the drawing relatively light compression coil springs 28 act between the lower ends of sleeves 11 and the suction cup members 13, partially counteracting springs 18 under empty or no-load condition, whereby the suction cups yield upwardly a slight amount when lowered against eggs. This assures engagement of the several suction cups with their registering eggs even though the eggs are encountered at different levels due to size variations. The springs 28 may be dispensed with and the weight of each tube 11 and suction cup 13 may be relied upon to hold the suction cup 13 at a proper lower limit position until eggs are encountered by the suction cups.

In a modified form of the present invention the valving action may be reversed so that the lifting device discriminates against eggs below a predetermined minimum weight, either by failure to lift the same or by releasing the eggs after lifting.

It is to be understood that the foregoing description is general and that the showing in the drawing herein is somewhat schematic, since in actual use the apparatus will generally be incorporated with egg handling machinery of various kinds and may readily be adapted thereto, the essential feature being an egg supporting or lifting device which provides for the release of eggs which vary from a predetermined weight standard by a predetermined degree.

What is claimed is:

1. Egg handling apparatus comprising a support member and a sleeve depending therefrom, a second sleeve coaxial with and depending from the first sleeve and slidable with respect thereto in an axial direction, and a downwardly directed suction cup at the lower end of the second sleeve for engagement with the upper part of an egg to support the same, said two sleeves comprising a sub-atmospheric fluid pressure passage to said suction cup to activate the same and said second sleeve being supported for yieldable downward movement, and normally non-registering openings in the walls of said sleeve adapted to register upon predetermined downward movement of said second sleeve to dissipate said sub-atmospheric fluid pressure to release eggs above a predetermined weight.

2. Egg handling apparatus comprising a support member and a sleeve depending therefrom, a second sleeve coaxial with and depending from the first sleeve and slidable with respect thereto in an axial direction, and a downwardly directed suction cup at the lower end of the second sleeve for engagement with the upper part of an egg to support the same, said two sleeves comprising a sub-atmospheric fluid pressure passage to said suction cup to activate the same and said second sleeve being supported for yieldable downward movement, and valve means operable upon predetermined downward movement of said second sleeve to render said sub-atmospheric fluid pressure ineffective and thus release eggs above a predetermined weight.

3. Egg handling apparatus comprising a support member and a sleeve depending therefrom, a second sleeve coaxial with and depending from the first sleeve and slidable with respect thereto in an axial direction, and a downwardly directed suction cup at the lower end of the second sleeve for engagement with the upper part of an egg to support the same, said two sleeves comprising a sub-atmospheric fluid pressure passage to said suction cup to activate the same, spring means in said passage yieldably urging said second sleeve toward an upper position, and normally non-registering openings in the walls of said sleeve adapted to register upon predetermined downward movement of said second sleeve to dissipate said sub-atmospheric fluid pressure to release eggs above a predetermined weight.

4. Egg handling apparatus comprising a support member and a sleeve depending therefrom, a second sleeve coaxial with and depending from the first sleeve and slidable with respect thereto in an axial direction, and a downwardly directed suction cup at the lower end of the second sleeve for engagement with the upper part of an egg to support the same, said two sleeves comprising a sub-atmospheric fluid pressure passage to said suction cup to activate the same, spring means in said passage yieldably urging said second sleeve toward an upper position, valve means operable upon predetermined downward movement of said second sleeve to render said sub-atmospheric fluid pressure ineffective and thus release eggs above a predetermined weight.

5. Egg handling apparatus comprising a support member and a sleeve depending therefrom, a second sleeve coaxial with and depending from the first sleeve and slidable with respect thereto in an axial direction, and a downwardly directed suction cup at the lower end of the second sleeve for engagement with the upper part of an egg to support the same, said two sleeves comprising a sub-atmospheric fluid pressure passage to said suction cup to activate the same and said second sleeve being supported for yieldable axial movement relative to the first sleeve, and normally non-registering openings in the walls of said sleeve adapted to register upon predetermined axial movement of said second sleeve to dissipate said sub-atmospheric fluid pressure to release eggs which vary in a predetermined degree from a given weight.

References Cited in the file of this patent

UNITED STATES PATENTS 2,606,658    Powell _____ Aug. 12, 1952